UNITED STATES PATENT OFFICE 2,040,115

STABLE BITUMINOUS EMULSIONS AND METHOD OF PREPARING THE SAME

Vilas E. Watts, San Francisco, Calif., assignor to American Bitumuls Company, San Francisco, Calif., a corporation of Delaware No Drawing. Application November 1, 1932, Serial No. 640,665

10 Claims. (Cl. 134—1)

This invention relates to the manufacture of emulsions or dispersions and has to do particularly with the treatment of emulsions during the process of emulsification or thereafter whereby they are rendered resistant to break-down, separation or inversion of phase.

The term emulsion, as here used, embraces those compositions of asphalt, pitch, tar, resin, wax, mineral and other oils and the like which are generally insoluble or immiscible in water and which are dispersed in fine subdivision in an aqueous vehicle, the aqueous vehicle surrounding the individual dispersed particles so that the dispersed material is in the internal phase and the aqueous vehicle is in the external or continuous phase.

Such emulsions are commonly used as binders and saturants for mineral aggregates and fibrous materials or they may be applied to surfaces as waterproofing agents. Emulsions of mineral oils and the like have been employed for medicinal purposes, and as plant sprays where it is desired to provide films of insecticidal or fungicidal material on vegetation.

These emulsions may be made with the aid of soaps, starches or other well known emulsifying agents or they may be made by processes in which no substantial proportion of such emulsifiers is used, as for example in accordance with the process of Braun United States Patent No. 1,737,491 by which bituminous emulsions are formed by adding molten bitumen and alkaline water to a preformed emulsion or according to the teachings of Montgomerie United States Patent No. 1,643,675 by which melted asphalt is mixed directly with a hot, dilute alkali solution.

These latter emulsions are generally termed "quick-breaking", that is, they tend to break down or separate into agglomerated masses when diluted with water, contaminated with electrolytes or foreign matter, combined with aggregates or fibrous material or applied to surfaces in the customary methods of handling. Other emulsions partake of quick-breaking characteristics to a greater or less degree depending on the character and quantity of emulsifying agent employed and the method of manufacture.

An object of the invention is to provide a method of manufacturing emulsions capable of mixing with aggregates or applying to surfaces without premature break-down.

Another object is to devise a method of protecting emulsions against premature break-down due to the addition of water or electrolytes and other foreign materials.

Another object is to produce an emulsion capable of being trowelled or brushed, alone or in admixture with other materials.

Another object is to stabilize an emulsion with a minor proportion of stabilizing agent whereby the purity of the finished product is substantially unimpaired.

Another object is to disclose a novel method of using casein for stabilizing emulsions against break-down whereby bacteriological and chemical decomposition is retarded and the stabilizing effect of the casein is prolonged.

These and other objects of the invention will be apparent from the following description of the problem and its solution, together with the typical example of a method for carrying out the process.

Proteid compounds, for example, casein, have long been used as primary emulsifiers or bituminous or oleaginous substances, and emulsions prepared by the use of casein are notable for their stability, even when the casein is employed in comparatively small amounts.

It has been the practice to use casein in the form of an alkaline caseinate or in alkaline solution obtained by dissolving or dispersing casein in aqueous sodium or potassium hydroxide. When so treated the casein partakes of the character of a highly colloidal material of extremely small particle size and it has been found that in this form, proportions of alkaline caseinate as low as 0.1% or more by weight of the emulsion, impart great resistance to break-down to otherwise quick-breaking emulsions.

It has been found that the use of alkaline caseinates has been greatly handicapped by deterioration of the casein after it has been incorporated in the emulsion, and that alkaline solutions of casein lose their stabilizing properties within a short period at ordinary temperatures and very rapidly at elevated temperatures. Hence, emulsions stabilized with alkaline casein solutions do not retain the characteristics imparted by the casein over extended periods, and soon lose their resistance to break-down due to the addition of electrolytes, dilution, or the mixing with aggregates or other materials.

The cause for this deterioration is not definitely known but it is believed to be the result of a progressive chemical reaction between the alkali and the casein due to the excess of alkali necessary to obtain initial solution, or to the presence of alkali in the emulsion to which the caseinate is added. The concentration of alkali required to promptly dissolve the casein is generally sufficient to cause subsequent deterioration, that is, to carry the chemical reaction beyond the point where the alkaline caseinate is an effective stabilizing agent. While it may be possible to produce an alkaline caseinate solution with weak enough alkali to prevent subsequent deterioration, the solution would be ineffective as a permanent stabilizer unless the emulsion with which it is used is substantially neutral in reaction. Emulsions of the quick-breaking type prepared by the aforementioned process of Braun or of Montgomerie are invariably quite alkaline in the external phase and such alkalinity is sufficient to promote the progressive deterioration of the alkaline caseinate even when the concentration of alkali in the stabilizing material has been carefully neutralized before its addition to the emulsion.

It has been discovered that the entire or partial neutralization of the emulsion after addition of casein or an alkali caseinate serves to prevent deterioration of the casein and to prolong the stabilizing effect of the addition. It has been found feasible in practice to produce the alkaline caseinate in situ by adding dry casein to an emulsion having an alkaline external phase and thereafter to neutralize to the desired degree the alkalinity of the alkaline phase, although a preformed alkaline caseinate may be utilized in the same manner. In either case it is essential that excess alkalinity be avoided in the finished product.

As an example of a preferred method of carrying out the process of the invention the following may be cited:

An emulsion of bitumen in alkaline water is first produced by either the process of Braun United States Patent No. 1,737,491 or Montgomerie United States Patent No. 1,643,675 in which the bitumen is in the internal phase and the external phase is an aqueous alkaline solution without any substantial proportion of other emulsifying agents otherwise added. Into this emulsion there is then stirred a proportion of dry, finely powdered casein in an amount of approximately 1% by weight of the emulsion. The casein is dissolved in the aqueous phase of the emulsion with the aid of the alkali there present. To the mixture thus formed is then added a solution of a weak acid such as orthophosphoric or boric acid in an amount sufficient to neutralize the alkalinity of the mixture to a pH value of approximately 8.5. Finally a small proportion of a preservative such as formaldehyde, phenol, sodium ortho-phenolphenate or the like is added to prevent bacteria or mould growth due to the casein addition.

While emulsions made by other processes, exclusive of such as employ the well known soap emulsifiers, may be employed in my present method of preparing mixing type emulsions having relatively permanent stability the method finds its greatest utility when applied to the aforementioned quick-breaking Braun or Montgomerie or similar emulsions which depend for emulsification on the interaction of materials contained in the bitumen or oil phase with alkali in the aqueous phase.

Emulsions of mineral oils and other oils may be stabilized by the process of the invention, for medicinal or agricultural use, thus producing finished products of the desired characteristics without introducing stabilizers of character or quantity as might impair the purity of the emulsions for the purposes intended.

Emulsions of bitumen in water of the class just described may be treated in accordance with the process of the invention so that they may after long periods in transit or in storage be diluted with water, mixed with electrolytes, combined with mineral aggregates or fibrous materials, or applied to surfaces, without premature breakdown or agglomeration.

Larger or small proportions of casein may be employed to obtain various degrees of stability or resistance to settlement without departing from the spirit of the invention, and while the invention has been described as particularly applicable to emulsions of bitumen in alkaline water, it should be understood that it is adapted to stabilizing other types of oil in water emulsions and that the invention comprehends all of the variations and modifications within the scope of the following appended claims.

I claim:

1. The method of stabilizing fluid, quick-breaking bituminous emulsions which comprises mixing alkali metal caseinate with the said emulsions, then adding an acid to bring the alkalinity of the emulsion to approximately pH 8.5 and thus prolong the stabilizing action of the caseinate, and finally adding a preservative for the casein.

2. The method of stabilizing quick-breaking bituminous emulsions which comprises mixing alkali metal caseinate with the said emulsions, then adding boric acid to bring the alkalinity of the emulsion to approximately pH 8.5 thus prolonging the stabilizing action of the caseinate, and finally adding formaldehyde to protect the casein from decomposition.

3. The method of stabilizing quick-breaking emulsions having an aqueous alkaline external phase which comprises adding casein to said emulsions and then adding a weak acid to reduce the alkalinity of the emulsion to approximately pH 8.5 and thereby prevent deterioration of the caseinate produced.

4. The method of stabilizing quick-breaking bituminous emulsions having an aqueous alkaline external phase which comprises producing an alkali metal caseinate in said external phase and then adding boric acid to bring the emulsion to a pH of approximately 8.5 to prevent further reaction between excess alkali and the alkaline caseinate.

5. The method of stabilizing quick-breaking bituminous emulsions having an aqueous alkaline external phase which comprises adding casein to said emulsions, then adding orthophosphoric acid in quantity sufficient to reduce the alkalinity of said emulsions to approximately pH 8.5 and finally adding a preservative for the casein.

6. The process of producing a stable fluid bituminous emulsion which consists in first forming a quick-breaking, bitumen in water emulsion, by mixing molten bitumen with a hot dilute, aqueous alkali solution, then adding to the emulsion so formed a small percentage of alkali metal caseinate to render the emulsion less quick-breaking, then adding a weak acid to adjust the pH of the emulsion to approximately 8.5, thereby to prolong the stabilizing action of the caseinate, and finally adding a preservative agent to protect the caseinate against destructive organisms.

7. In a method of converting quick-breaking bituminous emulsions to mixing type emulsions which comprises incorporating alkali metal caseinate therein, the subsequent step of adjusting the pH of the aqueous phase to about 8.5.

8. The method of rendering permanent any degree of mixability contributed to a fluid, quick-breaking bituminous emulsion through the incorporation therein of an alkali metal caseinate which consists in adjusting the pH of such emulsion to 8.5 and of adding thereto a material toxic to microorganisms.

9. A bituminous emulsion in emusified form comprising a stable bituminous emulsion admixed with a filler, the said emulsion comprising a preformed quick-breaking emulsion stabilized with an alkali caseinate, such emulsion being neutralized to a pH value of approximately 8.5 and containing a preservative for casein.

10. A bituminous emulsion in emulsified form comprises a stable bituminous emulsion admixed with a fibrous material, the said emulsion comprising a preformed quick-breaking emulsion stabilized with alkali caseinate, such emulsion being neutralized to a pH value of approximately 8.5 and containing a preservative for casein.

VILAS E. WATTS.